United States Patent
Nagao

(12) 
(10) Patent No.: US 6,628,842 B1
(45) Date of Patent: Sep. 30, 2003

(54) IMAGE PROCESSING METHOD AND APPARATUS

(75) Inventor: Kimitoshi Nagao, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 650 days.

(21) Appl. No.: 09/598,762

(22) Filed: Jun. 22, 2000

(30) Foreign Application Priority Data

Jun. 22, 1999 (JP) .......................................... 11-175187

(51) Int. Cl.$^7$ .......................... G06K 9/40; H04N 5/217; H04N 1/409; H04N 1/38
(52) U.S. Cl. ...................... 382/266; 382/264; 382/263; 382/260; 348/625; 348/622; 348/607; 358/463; 358/3.27; 358/3.26
(58) Field of Search ................................ 382/165, 167, 382/190, 199, 219, 220, 250, 251, 252, 255, 256, 260, 261, 262, 263, 264, 265, 266, 269, 272, 274, 275, 278, 282, 286, 287, 295, 298, 299, 300, 309; 348/607, 610, 615, 622, 625, 627; 358/3.26, 3.27, 532, 537, 540, 463, 464

(56) References Cited

U.S. PATENT DOCUMENTS

| | | | | |
|---|---|---|---|---|
| 4,813,077 A | * | 3/1989 | Woods et al. ................. 382/138 |
| 5,073,700 A | * | 12/1991 | D'Onofrio ..................... 235/436 |
| 5,245,678 A | * | 9/1993 | Eschbach et al. ............. 382/252 |
| 5,331,137 A | * | 7/1994 | Swartz .......................... 235/375 |
| 5,668,638 A | * | 9/1997 | Knox ............................ 358/3.1 |
| 5,848,224 A | * | 12/1998 | Nhu .............................. 358/1.9 |
| 6,023,537 A | * | 2/2000 | Wada et al. ................... 382/312 |
| 6,115,136 A | * | 9/2000 | Tsukamoto et al. .......... 358/1.18 |

FOREIGN PATENT DOCUMENTS

| | | |
|---|---|---|
| JP | 57-500311 | 2/1982 |
| JP | 57/500354 | 2/1982 |
| WO | WO81/03096 | 10/1981 |
| WO | WO81/03097 | 10/1981 |

* cited by examiner

Primary Examiner—Bhavesh M. Mehta
Assistant Examiner—Yosef Kassa
(74) Attorney, Agent, or Firm—Sughrue Mion, PLLC

(57) ABSTRACT

The image processing method and apparatus enhance the sharpness of photographic images recorded by a silver halide photographic system or a digital still camera. The method and apparatus determine a blur retaining but sharpness enhancing coefficient for enhancing sharpness of an edge region of an object but retaining blur of the image in the other region of the edge region of the object based on an edge intensity data obtained by performing edge detection on an original image data, subtract the original image data from sharpness enhanced image data obtained by applying sharpness enhancement, multiply the subtracting result by the blur retaining but sharpness enhancing coefficient and add the resulting product to the original image data to generate processed image data. In the method and apparatus, the principal object is enhanced in sharpness while, at the same time, the blur caused by the taking lens system is the background not including the principal object is recognized and kept as it is, so that a natural image retaining the photograph-like blur, that is, blurring quality can be produced.

10 Claims, 3 Drawing Sheets

IMAGE PROCESSING METHOD AND APPARATUS

BACKGROUND OF THE INVENTION

This invention relates to an image processing method and apparatus that enhance the sharpness of digital image while maintaining the blurred sense, that is, the blurring quality or lack of detail. The invention particularly relates to the technical field of a digital image processing method and apparatus that can not only suppress the graininess or other noise component of photographic or digital image but also enhance their sharpness while maintaining the necessary blurred sense.

In digital imaging technology, image data acquired either by recording silver halide photographic image or otherwise image with an image scanner or by making use of photoelectric devices is subjected to image processing and the resultant image is outputted from an image output printer. In order to restore the considerable deterioration in image sharpness caused by the scanner and the printer or to achieve intentional image sharpness enhancement, the edge portions of the recorded object (or subject) is usually enhanced by a so-called "sharpness enhancement" technique, which is conventionally performed by use of a Laplacian filter or unsharp masking (USM).

In the conventional sharpness enhancement process, the entire portion of the image is subjected to the same processing and not only the principal object but also the object or objects as the background of the principal object which has become blurred on account of the taking lens system is enhanced in sharpness to produce enhanced edges. If the original image contains the background which was intentionally recorded in a blurred state, the final image comes out differently from what was intended by the photographer. The object image as the background rendered or the background image which are blurred by the taking lens system, that is, the image having the necessary blur (blurring quality or lack of detail), is not reproduced faithfully but the unnaturally sharpened image having no blur is reproduced.

Such an unnatural enhancement of the edge portions of the object as the background is not the only problem with the conventional sharpness enhancement process. The graininess in the image as well as the noise component in the image data due to the electrical noise from the scanner as a device for inputting photographic image are enhanced to deteriorate the quality of the final image.

This second problem was successfully addressed in Japanese Domestic Announcement (kohyo) Nos. Sho 57-500311and57-500354, as well as P. G. Powell and B. E. Bayer, "A Method for the Digital Enhancement of Unsharp, Grainy Photographic Images" in the Proceedings of the International Conference on Electronic Image Processing, Jul. 26–28, 1982, pp. 179–183. According to the method proposed by Powell and Bayer in these references, suppression of graininess is accomplished by smoothing (with a low-pass filter) and sharpness enhancement is performed with an unsharp masking (high-pass filter). In the smoothing process, signal values for n×n pixels are multiplied by Gaussian or other type of weights such that the signals are smoothed to suppress graininess. In the sharpness enhancement process, image signals for m×m pixels are first used to determine differential values by calculation from the central pixel towards the surrounding pixels and if any differential value is smaller than a preset threshold, the pixel of interest is regarded as representing graininess or noise and removed by coring and the remaining differential values which are greater than the threshold are summed up, multiplied by a constant greater than 1.0 and added to the previously smoothed signals, thereby achieving sharpness enhancement.

However, if a blurred object as the background is processed by this method, it is enhanced in sharpness, particularly along the edges, to produce an unnaturally sharpened image lacking the necessary blur.

SUMMARY OF THE INVENTION

The present invention has been accomplished under these circumstances and has as a first object providing an image processing method for enhancing the sharpness of photographic images recorded by a silver halide photographic system or a digital still camera, characterized in that the recorded principal object is enhanced in sharpness while, at the same time, the blur caused by the taking lens system in the object or objects that is not the principal object or objects as the background of the photographic image is recognized and kept as it is to produce a natural image retaining the photographically necessary blurred sense.

A second object of the invention is to provide an image processing method which, when performing sharpness enhancement, maintains the blur of the background and suppresses, rather than enhances, graininess and other noise component in the image, thereby producing a natural photographic image of high quality that retains the necessary blurred sense and involves a reduced amount of graininess and other noise component.

A third object of the invention is to provide an image processing apparatus for implementing the method provided by the first object.

A fourth object of the invention is to provide an image processing apparatus for implementing this method provided by the second object.

In order to attain the first object described above, a first aspect of the present invention provides an image processing method comprising the steps of: applying sharpness enhancement to original image data to generate sharpness enhanced image data for a wholly sharpened image; performing edge detection on the original image data to determine edge intensity data for distinguishing an edge region of an object and the other region in an image; determining a blur retaining but sharpness enhancing coefficient for enhancing sharpness of the edge region of the object but retaining blur of the image in the other region of the edge region of the object based on the edge intensity data; subtracting the original image data from the sharpness enhanced image data to generate a sharpness enhancing component; multiplying the sharpness enhancing component by the blur retaining but sharpness enhancing coefficient to give a blur retaining but sharpness enhancing component; and adding the blur retaining but sharpness enhancing component to the original image data to generate processed image data for an image enhanced in the sharpness while retaining the blur.

In the first aspect, the other region of the edge region of the object includes preferably a blurred image region in which the blur of the image is to be retained.

Preferably, the blur retaining but sharpness enhancing coefficient has a value equal or nearly equal to 1.0 in the edge region of the object, slowly decreases with the increasing distance from the edge region of the object and has a preset value of from 0.0 to less than 1.0 in the blurred image region.

Preferably, the blur retaining but sharpness enhancing coefficient is expressed by the following equation (1):

$$C_{BS}(x,y) = b_0 + (1-b_0)E_V(x,y) \quad (1)$$

where $C_{BS}(x,y)$ is the blur retaining but sharpness enhancing coefficient, $E_V(x,y)$ is the edge intensity data which is normalized ($0 \leq E_V \leq 1$), and $b_0$ is a blur region sharpness enhancing coefficient for adjusting degree of sharpness enhancement to be applied to the blurred image region which is other than the edge region of the object.

In order to attain the second object described above, a second aspect of the present invention provides the image processing method which, in addition to the image processing method of the first aspect, further comprises the steps of: smoothing the original image data to generate smoothed image data; subtracting the smoothed image data from the sharpness enhanced image data to generate an edge/noise component including both a sharpness enhanced edge component of an object image and a sharpness enhanced noise component; determining a noise region weighting coefficient from the edge intensity data, identifying a noise component based on the noise region weighting coefficient and the noise/edge component and producing a noise suppressing component that introduces small variations in the noise component; and scaling the blur retaining but sharpness enhancing component to generate a first scaled component, adding the first scaled component to the original image data, scaling the noise suppressing component to generate a second scaled component and subtracting the second scaled component from the original image data, thereby creating the processed image data for the image that retains the blur but which is enhanced in sharpness and has the noise component suppressed.

In order to attain the third object described above, a third aspect of the present invention provides an image processing apparatus comprising: a sharpness enhancing unit for applying sharpness enhancement to original image data to generate sharpness enhanced image data for a wholly sharpened image; an edge detecting and computing unit for performing edge detection on the original image data and determining edge enhancement data for distinguishing between an edge region of an object and the other region in an image; a blur retaining coefficient computing unit by which a blur retaining but sharpness enhancing coefficient for retaining blur of the image in the other region of the edge region of the object is determined from the edge intensity data; a blur retaining but sharpness enhancing component computing unit for producing a blur retaining but sharpness enhancing component from the original image data, the sharpness enhanced image data generated in the sharpness enhancing unit, and the blur retaining but sharpness enhancing coefficient determined in the blur retaining coefficient computing unit; and a blur retaining but sharpness enhancing unit for adding the blur retaining but sharpness enhancing component produced by the blur retaining but sharpness enhancing component computing unit to the original image data, thereby creating processed image data for an image that retains the blur but which is enhanced in the sharpness.

In the third aspect, the other region of the edge region of the object includes preferably a blurred image region in which the blur of the image is to be retained.

Preferably the blur retaining but sharpness enhancing coefficient has a value equal or nearly equal to 1.0 in the edge region of the object, slowly decreases with the increasing distance from the edge region of the object and has a preset value of from 0.0 to less than 1.0 in the blurred image region.

Preferably, the blur retaining but sharpness enhancing coefficient is expressed by the following equation (1):

$$C_{BS}(x,y) = b_0 + (1-b_0)E_V(x,y) \quad (1)$$

where $C_{BS}(x,y)$ is the blur retaining but sharpness enhancing coefficient, $E_V(x,y)$ is the edge intensity data which is normalized ($0 \leq E_V \leq 1$), and $b_0$ is a blur region sharpness enhancing coefficient for adjusting degree of sharpness enhancement to be applied to the blurred image region which is other than the edge region of the object.

In order to attain the fourth object described above, a fourth aspect of the present invention provides the image processing apparatus which, in addition to the image processing apparatus of the third aspect, further comprises: a smoothing unit for smoothing the original image data to generate smoothed image data; a noise region weighting coefficient computing unit for determining a noise region weighting coefficient from the edge intensity data; an edge/noise component extracting unit for subtracting the smoothed image data from the sharpness enhanced image data to generate an edge/noise component including both a sharpness enhanced edge component of an object image and a sharpness enhanced noise component; a noise suppressing component computing section for identifying a noise component based on the edge/noise component and the noise region weighting coefficient and producing a noise suppressing component that introduces small variations in the noise component; and a blur retaining, sharpness enhancing and noise suppressing section for scaling the blur retaining but sharpness enhancing component to generate a first scaled component, adding the first scaled component to the original image data, scaling the noise suppressing component to generate a second scaled component and subtracting the second scaled component from the original image data, thereby creating the processed image data for the image that retains the blur but which is enhanced in the sharpness and has the noise component suppressed.

DETAILED DESCRIPTION OF THE INVENTION

The image processing method and apparatus of the invention are now described below in detail with reference to the preferred embodiments shown in the accompanying drawings.

Figure 1:
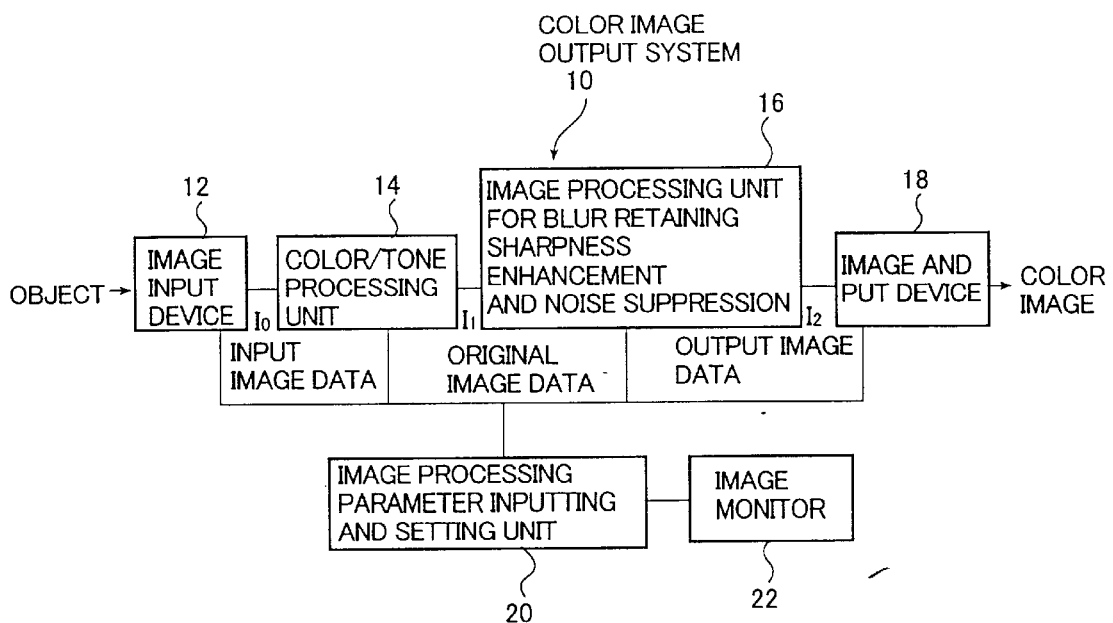
FIG. 1 is a block diagram showing a color image output system in which an embodiment of the image processing apparatus of the invention is incorporated, and in which a read color photographic image is outputted after being subjected to image processing for blur retaining sharpness enhancement and noise suppression.
Figure 2:
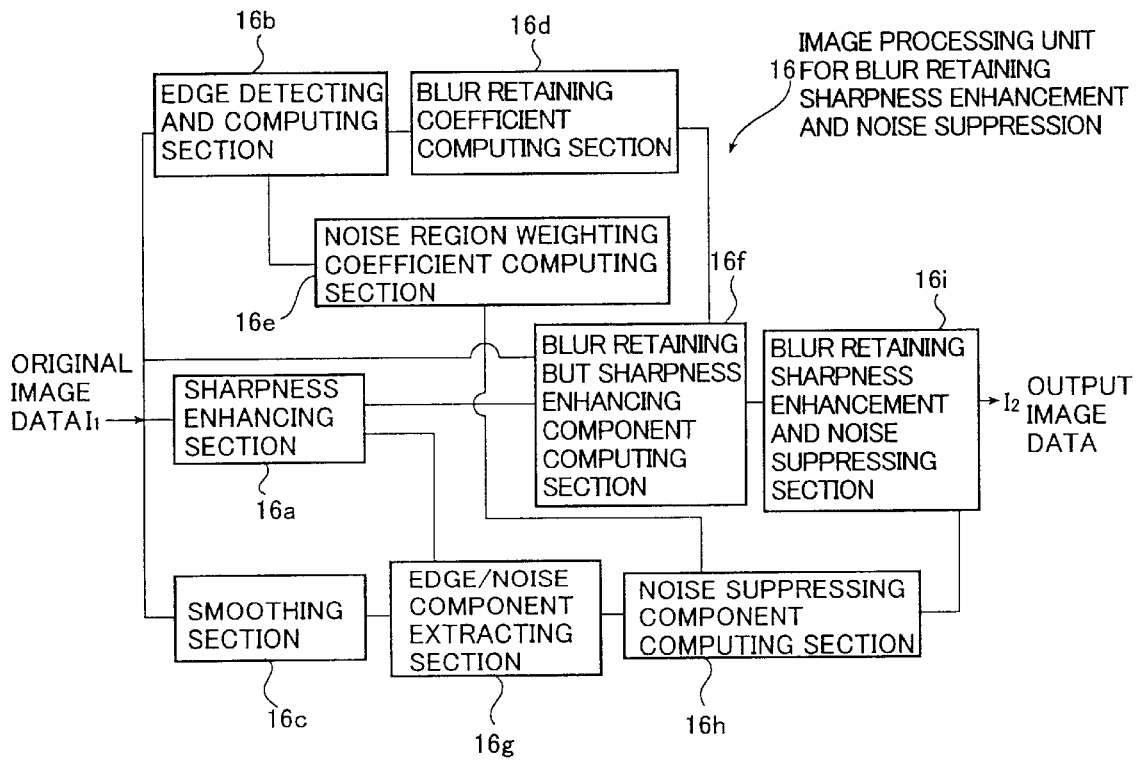
FIG. 2 is a block diagram showing an image processing unit for blur retaining sharpness enhancement and noise suppression in an embodiment of the image processing apparatus of the invention.
Figure 3:
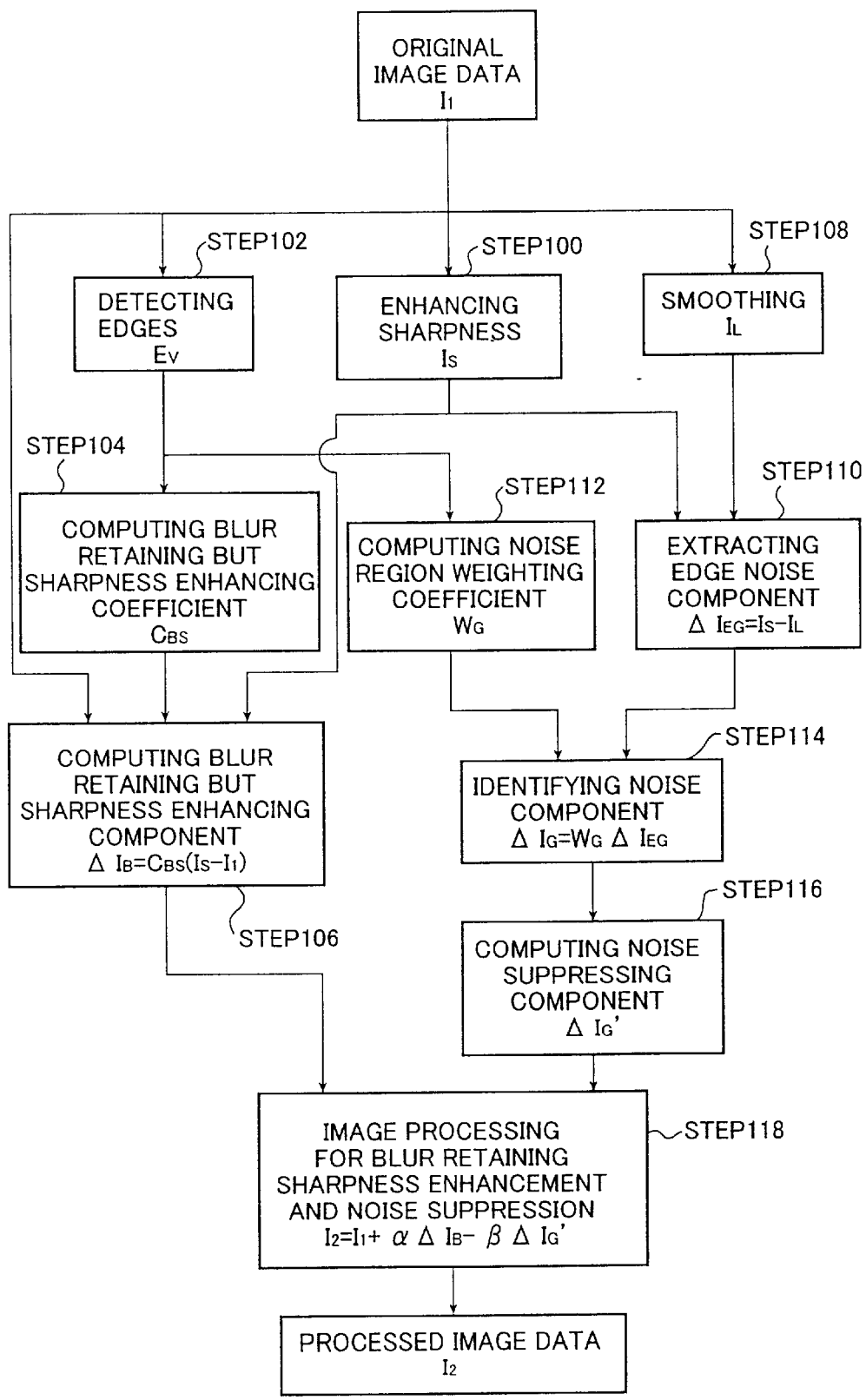
FIG. 3 is a flowchart showing an embodiment of the image processing method of the invention which is performed for blur retaining sharpness enhancement and noise suppression.
Figure 4:
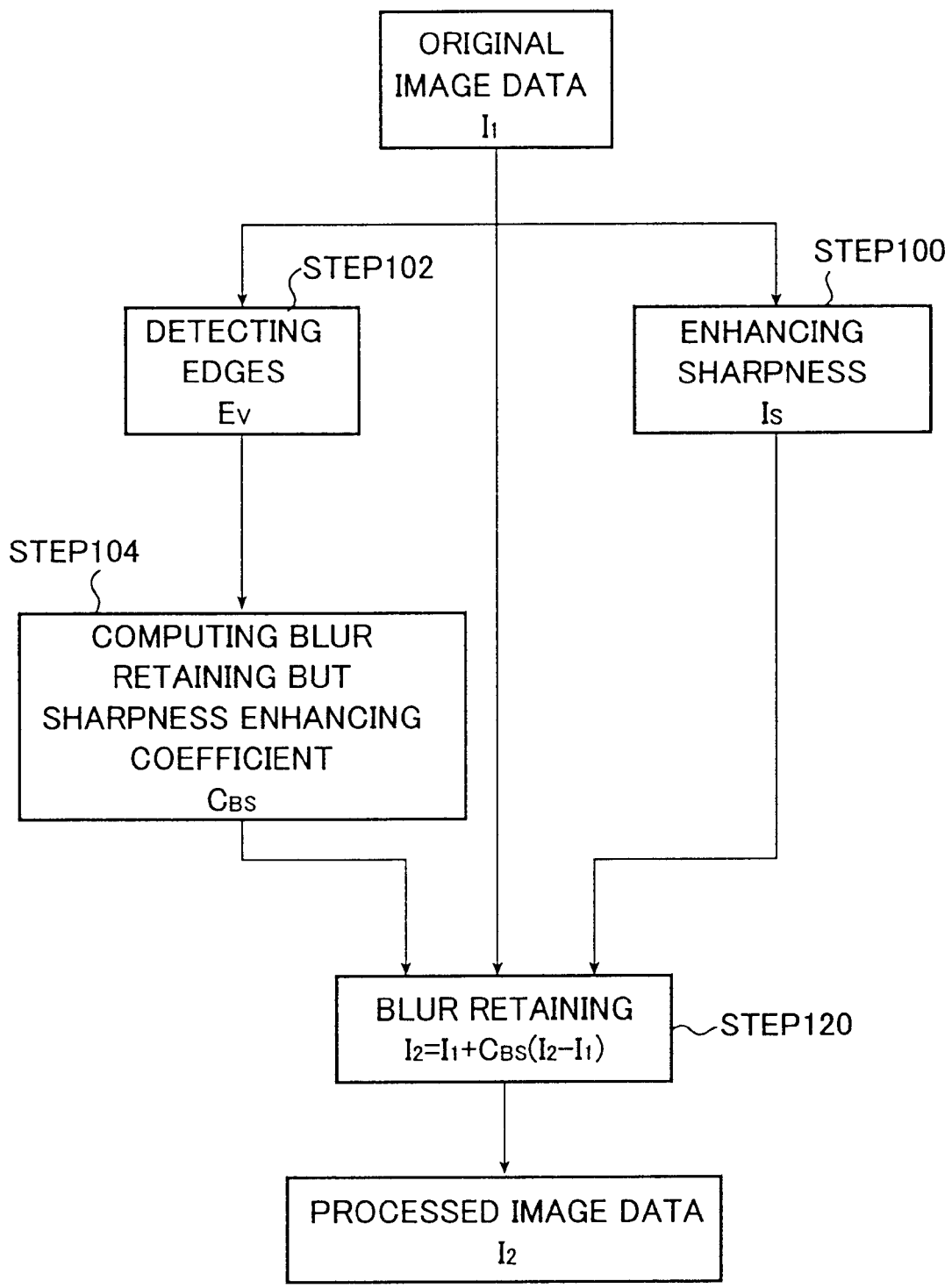
FIG. 4 is a flowchart showing another embodiment of the image processing method of the invention which is performed for blur retaining sharpness enhancement.

FIG. 1 is a block diagram showing a color image output system in which a color image is read, and the thus read color image is outputted after having been subjected to image processing such as blur retaining, sharpness enhancement and noise suppression in an image processing apparatus of the invention incorporated therein. FIG. 2 is a block diagram showing an embodiment of the image processing apparatus for implementing the image processing method of the invention. FIG. 3 is a flowchart showing an exemplary processing algorithm of the image processing method of the invention. FIG. 4 is a flowchart showing another exemplary processing algorithm of the image processing method of the invention. We now describe a color photographic image as a typical digital image.

It should be noted that the phrase "blur retaining" as used herein refers to "retaining or preserving the blur or the blurred sense". The phrase "blurred sense" in the present invention denotes in a narrow sense the blurring quality or lack of the detail, but may denote in a broad sense defocusing and the like.

As shown in FIG. 1, a color image output system 10 comprises an image input device 12 in which digital input image data is obtained by reading a color image such as a color photographic image (image on a film such as a color negative or reversal film) or taking with a photoelectric imaging device or the like; a color/tone processing unit 14 which adjusts image data $I_0$ from the image input device 12 to obtain and output original image data $I_1$ on which desired color and tone are reproduced; an image processing unit 16 for blur retaining sharpness enhancement and noise suppression of the invention in which the original image data $I_1$ is subjected to the image processing for retaining blur, enhancing sharpness and suppressing a noise component on the digital image thereby outputting processed image data $I_2$; an image output device 18 for outputting a color image such as a print image based on the output image data $I_2$ from the image processing unit 16 for blur retaining sharpness enhancement and noise suppression; an image processing parameter inputting and setting unit 20 in which an operator inputs and sets various types of image processing parameters for appropriately implementing image processing; and an image monitor 22 for displaying a reproduced image based on the image data subjected to image processing such as color/tone adjustment, blur retaining sharpness enhancement and noise suppression.

The image input device 12 creates digital color image data $I_0$ and outputs it as input image data to the color/tone processing unit 14. Examples thereof include a film scanner in which an image on a color (or monochromic) film such as a color (or monochromic) negative or reversal film is read to create digital image data; a scanner for reflection original in which an image on a color reflection original such as a printed document or a reflection print is read to create digital image data; a driver in which an electronic still camera or a video camera used in creating digital image data by directly photographing an object, or recording media for accommodating the thus created digital image data as exemplified by a Smart Media, semiconductor memories including a PC card, magnetic recording media including an FD and a Zip, magneto-optical recording media such as an MO and an MD, optical recording media including a CD-ROM and a Photo-CD, are driven to read digital image data; a display unit such as a CRT monitor or a liquid-crystal monitor in which the digital image data is read and displayed as a soft copy image; and computer systems including a PC and a WS for use in whole or partial image processing of the thus read or displayed digital image data.

The color/tone processing unit 14 performs color conversion or color correction (including gradation conversion or correction) on the input image data $I_0$ from the image input device 12 so that its color and tone (gradation) are appropriately reproduced in the image output device 18 thereby creating the original image data $I_1$ for implementing the image processing method of the invention. Specific processing schemes to be performed therein include, for example, a color (gray) conversion or correction, gradation correction, density (brightness) correction, saturation correction, scaling conversion, compression/expansion of density's dynamic range and the like.

The image processing unit for blur retaining sharpness enhancement and noise suppression (hereinafter referred to simply as "main image processing unit") 16 for implementing the image processing method of the invention is a site in which image processing of blur retaining sharpness enhancement and noise suppression characterizing the invention is performed on the original image data $I_1$ created in the color/tone processing unit 14 to thereby create the processed image data $I_2$ to be outputted to the image output device 18. This unit 16 will be described later in detail.

The image output device 18 outputs a color image having a color input image such as a color photographic image reproduced thereon, based on the processed image data $I_2$ outputted from the main image processing unit 16. Specific examples include image output devices including various types of digital color printers such as a digital photoprinter for outputting a color image on a hard copy (reflection print or reflection original), a copier, an electrophotographic printer, a laser printer, an ink-jet printer, a thermally sublimating printer and a TA; display units including a TV, a CRT monitor and a liquid-crystal monitor; and computer systems including a PC and a WS.

The image processing parameter inputting and setting unit 20 uses data input devices including a mouse and a keyboard (not shown) to set parameters for various image processing which is performed on the input image data $I_0$ from the image input device 12 in the color/tone processing unit 14 and the main image processing unit 16 where the image processing method of the invention is implemented. The parameters to be set therein include correction coefficients, conversion coefficients and magnifications to be used in various processing as described above, and other parameters such as coefficients necessary for implementing the image processing method of the invention to be described below in detail.

The image monitor 22 not only displays the input image based on the input image data $I_0$ from the image input device 12, but also is used as a screen display for setting parameters for color/tone processing in the color/tone processing unit 14 and the image processing in the main image processing unit 16 that are performed on the input image data $I_0$, (for example, by means of GUI) using data input devices including the mouse and the keyboard (not shown).

The main image processing unit 16 is a site characterizing the invention, and as mentioned above, the original image data $I_1$ created in the color/tone processing unit 14 is subjected to image processing of blur retaining sharpness enhancement and noise suppression characterizing the invention, thereby creating the processed image data $I_2$, which is then outputted to the image output device 18. The main image processing unit 16 comprises a sharpness enhancing section 16a, an edge detecting and computing section 16b, a smoothing section 16c, a blur retaining coefficient computing section 16d, a noise region weighting coefficient computing section 16e, a blur retaining but sharpness enhancing component computing section 16f, an edge/noise component extracting section 16g, a noise suppressing component computing section 16h and a blur retaining, sharpness enhancing and noise suppressing section 16i.

The sharpness enhancing section 16a is a site which performs sharpness enhancement processing for sharpening the whole image on the original image data $I_1$ obtained in the color/tone processing unit 14 to create sharpness enhanced image data $I_S$ and then sends the thus created sharpness enhanced image data $I_S$ to the blur retaining but sharpness enhancing component computing section 16f and the edge/noise component extracting section 16g.

Sharpness enhancement in the sharpness enhancing section 16a may be performed by any one of various methods described below, which include unsharp masking (USM) methods such as a Gaussian USM method, a gradient inverse weighted mean USM method, a zonal filtering USM method, a large difference attenuation USM method, a statistical differencing USM method, a relaxed USM method and a selective image sharpening method; differential methods such as a Laplacian method and a Pseudo-Laplacian method; and spatial frequency filtering methods using Fourier transform and wavelet transform. These methods can be utilized to enhance the sharpness of the image, if it is not so deteriorated.

For example, unsharp masking is a method of determining a sharpness enhanced image $I_S(x,y)$ by the following equation (2), in which the original image data $I_1(x,y)$ is averaged or blurred to yield an image $<I_1(x,y)>$ which is subtracted from $I_1(x,y)$ to give an edge enhanced component $I_1(x,y)-<I_1(x,y)>$, which is subsequently multiplied by a factor "a" and added to the original image $I_1(x,y)$:

$$I_S(x,y)=I_1(x,y)+a[I_1(x,y)-<I_1(x,y)>] \quad (2)$$

where "a" is a constant for adjusting the degree of sharpness enhancement and x,y are coordinates representing the position of a pixel of interest in the image.

Laplacian filtering is a method of enhancing the sharpness of the original image data $I_1(x,y)$ by subtracting a second partial derivative (Laplace operator or Laplacian) $\nabla^2 I_1(x,y)$ from the original image data, as expressed by the following equation (3):

$$I_S(x,y)=I_1(x,y)-\nabla^2 I_1(x,y) \quad (3)$$

Common specific examples of sharpness enhancement by Laplacian filtering are the following 3×3 coefficient arrays:

$$\begin{matrix} 0 & -1 & 0 \\ -1 & 5 & -1 \\ 0 & -1 & 0 \end{matrix} \quad \begin{matrix} -1 & -1 & -1 \\ -1 & 9 & -1 \\ -1 & -1 & -1 \end{matrix} \quad \begin{matrix} 1 & -2 & 1 \\ -2 & 5 & -2 \\ 1 & -2 & 1 \end{matrix} \quad (4)$$

With these coefficient arrays, particularly when intense sharpness enhancement is applied, an unnatural contour is most likely to occur along the edges of the image. In order to minimize this problem, unsharp masking is preferably performed in the invention using a normal distribution (Gaussian) blurring function as expressed by the following equation (5):

$$G(x,y)=(1/2\pi\sigma^2)\exp[-(x^2+y^2)/2\sigma^2] \quad (5)$$

where "$\sigma^2$" is a parameter representing the spread of the normal distribution function.

By ensuring that the ratio of the value of G(x,y) at a mask end $x=x_1$ to the value of the same function at the mask center x=0, which is expressed by the following equation (6):

$$G(x_1,0)/G(0,0)=\exp[-x_1^2/2\sigma^2] \quad (6)$$

is adjusted to lie between 0.1 and 1.0, a 3×3 unsharp mask can provide the desired sharpness. If the value of the equation (6) is adjusted to be close to 1.0, one can generate a mask that is substantially identical to the center Laplacian filter in the equation (4).

The mask sharpness can also be varied by adjusting the mask size; for example, the spatial frequency range for sharpness enhancement can be substantially altered by using masks of varying size such as 5×5, 7×7 and 9×9.

The function expressing the mask may be other than the one of a normal distribution, for example, an exponential function given by the following equation (7):

$$E(x,y)=\exp[-(x^2+y^2)^{1/2}/a] \quad (7)$$

where "a" is a parameter which has the same meaning as $\sigma^2$ in the equation (5) and represents the spread of the unsharp mask.

By ensuring that the ratio of the value of E(x,y) at a mask end $x=x_1$ to the value at the mask center x=0, which is expressed by the following equation (8):

$$E(x_1,0)/E(0,0)=\exp[-x_1/a] \quad (8)$$

is adjusted to lie between 0.1 and 1.0, a 3×3 unsharp mask can provide the desired sharpness. When $E(x_1,0)/E(0,0)=0.3$, the mask of an exponential function according to the equation (7) may numerically assume the following values:

$$\begin{matrix} 0.18 & 0.30 & 0.18 \\ 0.30 & 1.00 & 0.30 \\ 0.18 & 0.30 & 0.18 \end{matrix} \quad (9)$$

From this mask, an unsharp mask having the following values of the respective elements may be calculated:

$$\begin{matrix} -0.12 & -0.22 & -0.12 \\ -0.21 & 2.32 & -0.21 \\ -0.12 & -0.21 & -0.12 \end{matrix} \quad (10)$$

Using this unsharp mask, one can determine a sharpness enhanced image $I_S(x,y)$ from the original image data $I_1(x,y)$. It should be noted that the method of sharpness enhancement that can be employed in the invention is by no means limited to the embodiment described above and any other known methods of sharpness enhancement may of course be applicable.

The edge detecting and computing section 16b performs edge detection from the original image data $I_1$ obtained in the color/tone processing unit 14 to determine edge intensity data $E_V$ for distinguishing the edge region of the object from the other regions. The thus determined edge intensity data $E_V$ is then sent to the blur retaining coefficient computing section 16d and the noise region weighting coefficient computing section 16e.

In order to reduce the noise for easier edge detection, the edge detecting and computing section 16b converts the original image data $I_1$ to image data on which the visual sensitivity is reflected, before edge detection is performed. When the image recorded on a silver halide photographic film or the like is digitized and represented in terms of optical densities, preliminary treatment for converting RGB image data to visual density is performed. On the other hand, when the original image data $I_1$ is the one recorded with a digital still camera or the like, the image data is converted to luminance signals corresponding to the visual density mentioned above. We describe below the case where the image data is represented in terms of optical densities.

The image data $I^R$, $I_G$ and $I_B$ represented in terms of optical densities of R, G and B are converted to visual density $I_V$ to reduce adverse effects of the graininess or noise component of each color and to detect more easily edge information of the object in the image. The density values of three primaries R, G and B are multiplied by weighting factors r, g and b to convert them to the visual density $I_V$, as shown in the formula (11):

$$I_V = (rI_R + gI_G + bI_B)/(r+g+b) \quad (11)$$

The following ratio values are used as the weighting factors:

$$r:g:b=3:6:1 \quad (20)$$

$$r:g:b=4:5:1 \quad (12)$$

$$r:g:b=2:7:1$$

A preferred range of the values to be taken by the ratio r:g:b may be specified as follows: assuming r+g+b=10.0 and b=1.0, g is preferably in the range of 5.0–7.0, provided that r=10.0−b−g. The conversion mentioned above is capable of reducing graininess and noise component having no correlation between R, G and B by the effect of averaging and improving the precision of edge detection.

It should be noted here that the above method is also used to convert the image data recorded with a digital still camera or the like to the luminance signals corresponding to the visual density.

The edge detecting and computing section 16b uses the visual density $I_V$ obtained in the preliminary treatment mentioned above to calculate edge intensity.

An array of $N_E \times N_E$ pixels selected from the image data of visual density $I_V(x,y)$ and having the pixel of interest (x,y) at the center is moved as the standard deviation $\sigma_V(x,y)$ of the local density variations within the array is calculated by the following equation (12), whereby edge detection is performed. A preferred array size is on the order of 3×3, 5×5 or 7×7 pixels:

value between 0.0 and 1.0 using an exponential function given by the following equation (15):

$$E_V(x,y)=1-\exp[-\sigma_V(x,y)/a_B] \quad (15)$$

where "$a_B$" is a coefficient for normalizing the value of the standard deviation $\sigma_V(x,y)$ and if the threshold of the standard deviation $\sigma_V(x,y)$ assigned to $E_V(x,y)=0.5$ is written as $\sigma_T$, $a_B$ is given by the formula (16):

$$a_B = -\sigma_T/\log_e(0.5) \quad (16)$$

The threshold $\sigma_T$ depends upon the degree of sharpness of the original image. With a color image of 8 bits (256 gradations) for each color, $\sigma_T$ preferably takes values within a range of 10–100. The converting formula for determining the edge intensity data $E_V(x,y)$ is by no means limited to the equation (15) and other formulae may be substituted, as exemplified by a Gaussian function represented by the following equation (17):

$$E_V(x,y)=1-\exp\{-[\sigma_V(x,y)]^2/a_B^2\} \quad (17)$$

where "$a_B$" is a coefficient for normalizing the value of the standard deviation $\sigma_V(x,y)$ and if the threshold of the standard deviation $\sigma_V(x,y)$ assigned to $E_V(x,y)=0.5$ is written as $\sigma_T$, $a_B^2$ is given by the following equation (18):

$$a_B^2 = -\sigma_T^2/\log_e(0.5) \quad (18)$$

The thus obtained normalized edge intensity data $E_V(x,y)$ is sent to the blur retaining coefficient computing section 16d and the noise region weighting coefficient computing section 16e.

Instead of the operational formula (18) for determining the edge intensity data $E_V(x,y)$, look-up tables (LUTs) may be preliminarily constructed in the edge detecting and computing section 16b and used for obtaining the edge intensity data $E_V(x,y)$, which enables remarkable shortening of the time required for calculation.

The above-described local variance method is not the only way to be used for edge detection in the edge detecting and computing section 16b and any one of the following edge detecting techniques may be employed which include a method of determining an absolute value by locally differentiating an array of $N_E \times N_E$ pixels being moved. More specifically, zero-crossing methods include a Marr-Hildreth method, a Gaussian filtering method and a DOG (difference $$\sigma_V(x,y) = \left\{ \left( \left( \frac{1}{N_E^2} \sum_{k=1}^{NE} \sum_{l=1}^{NE} \left[ Iv\left(x+k-\frac{NE}{2}-\frac{1}{2}, y+l-\frac{NE}{2}-\frac{1}{2}\right) - \langle Iv(x,y)\rangle \right]^2 \right) \right) \right\}^{1/2} \quad (13)$$

where the visual density $I_V(x+k-N_E/2-\frac{1}{2}, y+1-N_E/2-\frac{1}{2})$ is the visual density of the array of $N_E \times N_E$ pixels which is used in calculating local variances, and $\langle I_V(x,y)\rangle$ is the average visual density of the array and expressed by the following equation (14):

$$\langle Iv(x,y)\rangle = \frac{1}{N_E^2} \sum_{k=1}^{NE} \sum_{l=1}^{NE} Iv\left(x+k-\frac{NE}{2}-\frac{1}{2}, y+l-\frac{NE}{2}-\frac{1}{2}\right) \quad (14)$$

Further, the edge detecting and computing section 16b determines the edge intensity data $E_V(x,y)$ by normalizing the standard deviation $\sigma_V(x,y)$ of the visual density to a of Gaussian) method; methods based on second derivatives include a Laplacian method and a Pseudo-Laplacian method; methods based on first derivatives include differential types using Prewitt's operator, Sobel's operator and Roberts' operator and template types by Robinson's operator using a 3×3 template equivalent to edge patterns for 8 directions, Prewitt's operator and Kirsh'es operator; statistical processing methods include a ripple filtering; other methods include the ones using Hueckel's operator, Frei & Chen's operator, Triendl'soperator, Kasvand's operator, Eberlein's operator and Tanimoto's operator; a fuzzyset method, an AI method, a hysteresis smoothing method, and a symmetric hysteresis smoothing method.

The smoothing section 16c subjects the original image data $I_1(x,y)$ obtained in the color/tone processing unit 14 to smoothing to determine smoothed image data $I_L(x,y)$, which is then sent to the edge/noise component extracting section 16g.

The smoothing section 16c may perform smoothing by any one of the following various methods that include local averaging techniques by simple averaging method or Gaussian method, as exemplified by a k-nearest neighbor averaging method, an edge and line weights method, a contrast-sensitive weights method, a relaxation method, a gradient inverse weights smoothing method, an edge preserving smoothing method, a slope facet model smoothing method, a hysteresis smoothing method, a maximum homogeneity smoothing method, a sigma filtering method, an adaptive nonlinear filtering method, a generalized mean filtering method and a median filtering method; and other methods are by means of E-filter (nonlinear low-frequency filter), convolution of PSF (point spread function), spatial frequency filtering using Fourier transform, and filtering using wavelet transform.

We now describe, as an example, a local averaging method. The sum of all adjoining pixels is determined using a weighting coefficient according to the following equation (19):

$$I_L(x,y) = \frac{1}{N^2}\sum_{k=1}^{N}\sum_{l=1}^{N} W(k,l) I_1\left(x+k-\frac{N}{2}-\frac{1}{2}, y+l-\frac{N}{2}-\frac{1}{2}\right) \quad (19)$$

where "N" is an averaging mask size and "w" is a weighting coefficient. Simple average is obtained when w=1.0.

The processing mask to be used in the illustrated case is preferably an array of N×N pixels as set forth below. Specifically, masks of sizes on the order of 3×3, 5×5, 7×7 and 9×9 pixels are preferably employed:

$$\begin{matrix} w_{11} & w_{12} & w_{13} & \ldots & w_{1N} \\ w_{21} & w_{22} & w_{23} & \ldots & w_{2N} \\ w_{31} & w_{32} & w_{33} & \ldots & w_{3N} \\ \vdots & \vdots & \vdots & & \vdots \\ w_{N1} & w_{N2} & w_{N3} & \ldots & w_{NN} \end{matrix} \quad (20)$$

An exemplary mask of 9×9 pixels is shown below by the formula (21) which is normalized to 1.0 at the central value. In actual processing, the values of the respective pixels are so selected that their total sum is 1.0.

$$\begin{matrix} 0.09 & 0.15 & 0.22 & 0.28 & 0.30 & 0.28 & 0.22 & 0.15 & 0.09 \\ 0.15 & 0.26 & 0.38 & 0.47 & 0.51 & 0.47 & 0.38 & 0.26 & 0.15 \\ 0.22 & 0.38 & 0.55 & 0.69 & 0.74 & 0.69 & 0.55 & 0.38 & 0.22 \\ 0.28 & 0.47 & 0.69 & 0.86 & 0.93 & 0.86 & 0.69 & 0.47 & 0.28 \\ 0.30 & 0.51 & 0.74 & 0.93 & 1.00 & 0.93 & 0.74 & 0.51 & 0.30 \\ 0.28 & 0.47 & 0.69 & 0.86 & 0.93 & 0.86 & 0.69 & 0.47 & 0.28 \\ 0.22 & 0.38 & 0.55 & 0.69 & 0.74 & 0.69 & 0.55 & 0.38 & 0.22 \\ 0.15 & 0.26 & 0.38 & 0.47 & 0.51 & 0.47 & 0.38 & 0.26 & 0.15 \\ 0.09 & 0.15 & 0.22 & 0.28 & 0.30 & 0.28 & 0.22 & 0.15 & 0.09 \end{matrix} \quad (21)$$

Thus, the smoothing section 16c is adapted so that smoothed image data $I_L(x,y)$ can be obtained from the original image data $I_1(x,y)$.

The blur retaining coefficient computing section 16d calculates a blur retaining but sharpness enhancing coefficient $C_{BS}(x,y)$ from the edge intensity data $E_V(x,y)$ obtained in the edge detecting and computing section 16b. The thus calculated coefficient $C_{BS}(x,y)$ is sent to the blur retaining but sharpness enhancing component computing section 16f.

That is, the blur retaining but sharpness enhancing coefficient $C_{BS}(x,y)$ which is used to enhance sharpness in the edge region of the object while retaining blur as it is in other regions than the edge region without enhancing sharpness or by applying only a small degree of sharpness enhancement is determined using the normalized edge intensity data $E_V(x,y)$ according to the following equation (22):

$$C_{BS}(x,y)=b_0+(1-b_0)E_V(x,y) \quad (22)$$

where $b_0$ is a blurred region sharpness enhancing coefficient for setting the degree of sharpness enhancement in the blurred region, and a value ranging from 0 to 1 is set in the image processing parameter inputting and setting unit 20. When the blurred region sharpness enhancing coefficient $b_0$ assumes 0, the blurred region of the image except the edge region of the object, or the blurred region has no sharpness enhancement. In contrast, when the blurred region sharpness enhancing coefficient $b_0$ assumes 1, sharpness is enhanced on the entire screen irrespective of whether the region is the edge region or the blurred region. Therefore, the preferred range of $b_0$ for maintaining the desired blur is between 0.0 and 0.8, with the range of 0.0–0.5 being more preferred.

The value of the blurred region sharpness enhancing coefficient $b_0$ for obtaining the desired blur depends on the degree of sharpness (or blur) of the original image and the degree of sharpness enhancement according to the present invention. When the original image is not sharpened favorably and requires intense sharpness enhancement, the blurred region sharpness enhancing coefficient $b_0$ assumes preferably a smaller value. On the other hand, when the original image is favorably sharpened and requires only a small degree of sharpness enhancement, the blurred region sharpness enhancing coefficient $b_0$ assumes preferably a larger value. The degree of the "desired blur" differs depending on the photographer's intention and the observer's subjective, and hence is deemed to have substantial differences. Therefore, the blurred region sharpness enhancing coefficient $b_0$ also has a significantly varying range. In the present invention, desired blur can be obtained by setting the blurred region sharpness enhancing coefficient $b_0$ to the range of from 0 to 0.8.

Instead of the operational formula (22) for determining the blur retaining but sharpness enhancing coefficient $C_{BS}(x,y)$, LUTs may be preliminarily constructed in the blur retaining coefficient computing section 16d and used for obtaining the blur retaining but sharpness enhancing coefficient $C_{BS}(x,y)$, which enables remarkable shortening of the time required for calculation.

The blur retaining but sharpness enhancing component computing section 16f is a section where the blur retaining but sharpness enhancing component $\Delta I_{BS}(x,y)$ is obtained from the blur retaining but sharpness enhancing coefficient $C_{BS}(x,y)$ determined in the blur retaining coefficient computing section 16d, the original image data $I_1(x,y)$ and the sharpness enhanced image data $I_S(x,y)$ determined in the sharpness enhancing section 16a, and the thus obtained component $\Delta I_{BS}(x,y)$ is sent to the blur retaining, sharpness enhancing and noise suppressing section 16i.

The blur retaining but sharpness enhancing component $\Delta I_{BS}(x,y)$ is calculated according to the following equation (23):

$$\Delta I_{BS}(x,y)=C_{BS}(x,y)(I_S(x,y)-I_1(x,y)) \quad (23)$$

The original image data $I_1(x,y)$ is subtracted from the sharpness enhanced image data $I_S(x,y)$ to obtain the sharpness enhancing component, which is multiplied by the blur retaining but sharpness enhancing coefficient $C_{BS}(x,y)$. Thus, the blur retaining but sharpness enhancing component $\Delta I_{BS}(x,y)$ is obtained in which the edge region of the object has a larger value of the sharpness enhancing component, whereas the other blurred region has a smaller or an almost zero value.

The noise region weighting coefficient computing section 16e subtracts the normalized edge intensity data $E_V(x,y)$ obtained in the edge detecting and computing section 16b from the value of 1.0 to determine the noise region weighting coefficient $W_G(x,y)$, which is sent to the noise suppressing component computing section 16h. Since the normalized edge intensity data $E_V(x,y)$ is equivalent to the edge region weighting coefficient $W_E(x,y)$, the noise region weighting coefficient $W_G(x,y)$ can be obtained by subtracting the edge intensity data $E_V(x,y)$ from 1.0.

The edge/noise component extracting section 16g is a section in which the smoothed image data $I_L(x,y)$ determined in the smoothing section 16c is subtracted from the sharpness enhanced image data $I_S(x,y)$ determined in the sharpness enhancing section 16a to obtain the edge/noise component $\Delta I_{EG}(x,y)$, which is sent to the noise suppressing component computing section 16h.

The noise suppressing component computing section 16h is a section in which the noise region weighting coefficient $W_G(x,y)$ obtained in the noise region weighting coefficient computing section 16e and the edge/noise component $\Delta I_{EG}(x,y)$ obtained in the edge/noise component extracting section 16g are used to determine the noise suppressing component $\Delta I_G'(x,y)$, which is sent to the blur retaining, sharpness enhancing and noise suppressing section 16i.

The noise suppressing component computing section 16h performs the following image processing: In order to obtain the noise suppressing component $\Delta I_G'(x,y)$, the noise component must be distinguished and separated from the edge component of the object. To this end, the characteristics of the noise component and edge component are utilized. In a spatial domain, the noise component occurs in the entire part of the image and it is more conspicuous in the flat area of the object than along its contour and edges. On the other hand, the edge component of the image mainly occurs along the contour of the object and in a fine structure on its surface. In a density domain, the noise component is mainly composed of the grain of the photographic material used in taking the original image and electrical noise due to a digital still camera or the like, so it has in most cases a small density difference. On the other hand, the edge component of the image depend on the contrast of the object and, their density difference varies greatly with the image and range from a very small difference to a significantly great one.

For distinguishing and separating the noise region and edge region, they are first subjected to regional splitting by making use of their spatial characteristics. By multiplying the edge/noise component $\Delta I_{EG}(x,y)$ obtained in the edge/noise component extracting section 16g by the noise region weighting coefficient $W_G(x,y)$ determined in the noise region weighting coefficient computing section 16e, the edge information can be reduced to yield a signal $\Delta I_G(x,y)$ having an increased proportion of the noise information:

$$\Delta I_G(x,y)=W_G(x,y)\times\Delta I_{EG}(x,y) \tag{24}$$

Subsequently, image information about the noise component and image information about the edge component of the object are separated by making use of the characteristics in the density domain. A signal with a small density difference is mainly composed of a noise component and a small portion of an edge component whereas image data of a great density difference is mainly composed of an edge component of the object and a small portion of a noise component with a comparatively large density difference; hence, the relative magnitude of density difference can be used to separate the noise and edge components. Separation of the noise component $G_0(x,y)$ is performed using a LUT for nonlinear conversion as expressed by the following equation (25):

$$G_0(x,y)=\text{LUT}(\Delta I_G(x,y)) \tag{25}$$

where LUT is given by:

$$\text{LUT}(\Delta D)=\Delta D\times\exp[-(\Delta D)^2/a_G^2] \tag{26}$$

where $a_G^2$ is a constant determined from a threshold $G_T$ for differentiating the density variation of the noise and expressed by:

$$a_G^2=-G_T^2/\log_e(\tfrac{1}{2}) \tag{27}$$

The threshold $G_T$ is such that density variations in the edge/noise component $\Delta I_{EG}(x,y)$ below this value are regarded as the noise component. As will be readily understood from the equation (26), the edge and noise separation is not as sharp as is effected by turning a switch on and off at that threshold but the noise component to be separated decreases in accordance with a LUT profile that gradually decreases in value with the increasing density variation. Therefore, the edge component also occurs together with the noise component but in a gradually decreasing proportion.

If the nonlinear conversion LUT is written as a nonlinear conversion function NLG and the edge/noise component as $\Delta I_{EG}(x,y)$, then the noise component $G_0(x,y)$ can be expressed as follows by reference to the equations (24) and (25):

$$G_0(x,y)=\text{NLG}\{\Delta I_{EG}(x,y)\times W_G(x,y)\} \tag{28}$$

The noise component $G_0(x,y)$ can be thus obtained.

The noise component in the image to be processed consists of fine density variations, which can be considered as the combination of two variations, one being the variation in the amplitude of a density value and the other being the spatial variation.

The purpose of image processing directed to suppression of noise component is to make the noise component less marked to the eye. The noise component can of course be suppressed by reducing both the density amplitude and the spatial magnitude but, at the same time, the visual effect of improvement is no longer discernible if the amplitude and the magnitude both become smaller than certain levels. However, with digital images, the pixel size determines a spatial minimal unit whereas the density resolution of data (in case of 8-bit image data, the density resolution is equivalent to density difference between two levels in 256-level density values) defines a minimal unit of density amplitude, and values smaller than these minimal units are physically impossible to realize.

When the noise component consist of graininess on a silver halide photograph, mottling spatially varies in size and with the smaller mottles, fine signal and density variations occur on a pixel basis but with the larger mottles, signal and density variations not only occur in the pixel of interest but also span several surrounding pixels. The signals that vary on a pixel basis cannot be subdivided any further but large grainy mottles spanning multiple pixels can be spatially subdivided to become visually less pronounced.

We now describe the purpose of subdividing the grainy mottles and the effects obtained.

If the extracted noise component $G_0(x,y)$ or graininess of a silver halide photograph is subtracted from the original image data either as it is or after being multiplied by a coefficient, the result is close to a smoothed image and is not visually preferred since the graininess has become blurred. To solve this problem, the fluctuating density component of large grainy mottles is multiplied by a subdividing mask so that fine variations are introduced in the density fluctuation, thereby creating the noise (i.e., graininess) suppressing component $\Delta I_G'(x,y)$, which is then subtracted from the grainy original image data. As a result, the initial large fluctuation in graininess is eliminated and only fine density fluctuations are left intact, eventually reducing the large grainy mottles to fine graininess.

The subdividing process is highly effective if graininess involves large grainy mottles spanning multiple pixels; on the other hand, it is not effective if the noise component is spatially fine on a pixel basis as in the case of an image recorded with a digital still camera. In the latter case, the noise component can be suppressed by decreasing the variation in the amplitude of density value or fluctuation in density signal rather than the spatial variation including large fluctuation.

To reduce the noise component in grainy mottles, the noise component $G_0(x,y)$ is first detected and multiplied by a subdividing mask $R(x,y)$ composed of subdividing random numbers or a fine pattern such as a grid pattern, thereby yielding a noise suppressing component $\Delta I_G'(x,y)$:

$$\Delta I_G'(x,y) = R(x,y) \times G_0(x,y) \quad (29)$$

A subdividing mask $R(x,y)$ may have any pattern such as one of random numbers, as well as a dot-like pattern (e.g. ordinary two-dimensional dots, a one-dimensional frequency screen or a FM screen) and an error-distributed pattern. Among these patterns, one of random numbers is preferred since it is free from artifacts such as moire.

Various kinds of random numbers are available, such as uniform random numbers, normal random numbers, Poisson random numbers and binomial random numbers, and normal random numbers which resemble fluctuations occurring in nature are preferred. The fluctuations in nature are said to be best simulated by 1/f fluctuations, which hence is suitable for the purpose under consideration.

It should be noted here that in a noisy image on a pixel basis such as an image with fine graininess or an image recorded with a digital still camera, the noise component $G_0(x,y)$ is preferably used as the noise suppressing component $\Delta I_G'(x,y)$ without being subdivided.

The noise suppressing component computing section 16$h$ performs the image processing mentioned above, and the thus obtained noise suppressing component $\Delta I_G'(x,y)$ is sent to the blur retaining, sharpness enhancing and noise suppressing section 16$i$, where the blur retaining but sharpness enhancing component $\Delta I_{BS}(x,y)$ obtained in the blur retaining but sharpness enhancing component computing section 16$f$ is multiplied by a scaling coefficient $\alpha$ and added to the original image data $I_1(x,y)$. At the same time, the noise suppressing component $\Delta I_G'(x,y)$ obtained in the noise suppressing component computing section 16$h$ is multiplied by a scaling coefficient $\beta$ and subtracted from the original image data $I_1(x,y)$. The processed image data $I_2(x,y)$ obtained according to the following equation (30):

$$I_2(x,y) = I_1(x,y) + \alpha \Delta I_{BS}(x,y) - \beta \Delta I_G'(x,y) \quad (30)$$

is then outputted from the main image processing unit 16.

The scaling coefficients $\alpha$ and $\beta$ are parameters that the operator can set as image processing parameters by inputting in the image processing parameter inputting and setting unit 20, and the operator can set these parameters while viewing the processed image displayed on the image monitor 22. Predetermined values may also be utilized.

The main image processing unit 16 is constructed as mentioned above.

In the embodiment under consideration, the main image processing unit 16 includes the noise region weighting coefficient computing section 16$e$ and the noise suppressing component computing section 16$h$ to determine the noise suppressing component $\Delta I_G'(x,y)$ by multiplying the noise component by a coefficient using random numbers, in particular by introducing fine modulations in the large variation in graininess. However, this is not the sole method of extracting the noise suppressing component $\Delta I_G'(x,y)$ and other methods may be utilized.

First, the object is recorded with the image input device 12 such as a digital still camera to produce digital color image data $I_0$. Alternatively, $I_0$ may be obtained by scanning with a scanner or the like a film on which the object was recorded. The image data $I_0$ is then outputted to the color/tone processing unit 14 and the image processing parameter inputting and setting unit 20.

Looking at the image being reproduced from the received image data $I_0$ on the image monitor 22, the operator working on the image processing parameter inputting and setting unit 20 sets any necessary parameters for the various processing schemes that are to be performed in the color/tone processing unit 14, as exemplified by color (gray) conversion and correction, gradation correction, density (brightness) correction, chroma correction, scaling, as well as the compression and expansion of the density's dynamic range.

The color/tone processing unit 14 performs these various image processing schemes in accordance with the parameters set by the image processing parameter inputting and setting unit 20. Each time a certain image processing scheme is effected, the result is displayed on the image monitor 22 and the operator makes optimal adjustment of the parameters while looking at the display. The final processed image data $I_1$ with optimal adjustments is sent to the main image processing unit 16 as original image data.

An example of the image processing method of the invention is shown by flowchart in FIG. 3. According to the flowchart, the main image processing unit 16 processes the original image data $I_1$ to give processed image data $I_2$ through the steps set forth below. In the following description, indication of image data is accompanied by (x,y) which represents the position of a pixel of interest.

Briefly, the image processing method of the invention comprises the following steps:

i) the original image data is enhanced in sharpness to sharpen not only the image but also graininess and other noise component in the image;

ii) the edge of the object in the image is detected and the sharpness of the image is recognized to produce a sharp edge region of the object but in a blurred region such as the background, the necessary blur is maintained without sharpness enhancement;

iii) with the aid of the information acquired by edge detection, separation between the edge region of the object and the noise region is also effected for graininess and other noise component so that they are selectively suppressed or eliminated;

iv) in consequence, an image of good quality is produced that is sharpness enhanced in the edge portions, retains the blur of the blurred region and is suppressed in graininess and other noise component in the noise region.

We now describe the flowchart in FIG. 3 in greater detail. The original image data $I_1(x,y)$ is first subjected to sharpness enhancement (step 100) by a suitable technique such as unsharp masking to produce sharpness enhanced image data $I_S(x,y)$ characterized by improved overall image sharpness according to the equation (2), in which constant a for adjustment of the degree of sharpness enhancement is preliminarily set and may optionally be adjusted by the operator working on the image processing parameter inputting and setting unit 20. As already mentioned, sharpness enhancement may be accomplished by any known techniques.

In the next step 102, the original image data $I_1(x,y)$ is subjected to edge detection so that its edges are detected to determine edge intensity data $E_V(x,y)$ for distinguishing the edge region of the object from other regions.

If the original image data $I_1(x,y)$ is represented by optical densities R, G and B, a preliminary treatment for edge detection is performed by converting image data $I_R(x,y)$, $I_G(x,y)$ and $I_1(x,y)$ to visual density $I_V(x,y)$ according to the equations (11) and (12). The purpose of this treatment is to reduce the effect of graininess and other noise component on individual colors so that the edge information for the object in the image can be easily detected. The image data captured by recording with a digital still camera is also subjected to the preliminary treatment so that it is converted to luminance signals corresponding to visual density.

From the obtained visual density $I_V(x,y)$, its standard deviation $\sigma_V(x,y)$ is calculated by the equations (13) and (14) and normalized to a value between 0.1 and 1.0 by the equation (15) so as to determine edge intensity data $E_V(x,y)$. Coefficient $a_B$ for normalizing the value of standard deviation $\sigma_V(x,y)$ is preliminarily set and may optionally be adjusted by the operator working on the image processing parameter inputting and setting unit 20.

The transformation formula for determining the edge intensity data $E_V(x,y)$ is in no way limited to the equation (15) and may be replaced by a Gaussian function. The local variance method is not the only way to detect edges of the image and may be replaced by any one of various known edge detecting methods.

In the next step 104, the edge intensity data $E_V(x,y)$ obtained in step 102 is used to calculate the blur retaining but sharpness enhancing coefficient $C_{BS}(x,y)$ in accordance with the equation (22). Blurred region sharpness enhancing coefficient $b_0$ for setting the degree of sharpness enhancement of the blurred region is preliminarily set but, if necessary, a value between 0 and 1 may be entered from the image processing parameter inputting and setting unit 20. The preferred range of $b_0$ for maintaining the desired blur is between 0.0 and 0.8, with the range of 0.0–0.5 being more preferred.

From the thus determined blur retaining but sharpness enhancing coefficient $C_{BS}(x,y)$, the blur retaining but sharpness enhancing component $\Delta I_{BS}(x,y)$ is determined in the next step 106 by mathematical operation in accordance with the equation (23). As a result, the blur retaining but sharpness enhancing component $\Delta I_{BS}(x,y)$ is obtained which, depending upon the value of the blur retaining but sharpness enhancing coefficient $C_{BS}(x,y)$, has a larger value of the sharpness enhancing component in the edge region of the object but has a smaller or an almost zero value in the other (blurred) region. As will be described later, the blur retaining but sharpness enhancing component $\Delta I_{BS}(x,y)$ is finally added to the original image data $I_1(x,y)$. In the image region other than the edges of the object, the noise component tends to be more pronounced than in the edge region and an intentionally blurred background region also exists in this image region. Therefore, by applying no sharpness enhancement or by applying only a small degree of sharpness enhancement, the intentional blur in the background region other than the edge region can be maintained without making the noise component unduly pronounced.

While the original image data $I_1(x,y)$ is subjected to sharpness enhancement (step 100) and edge detection (step 102), it is also subjected to smoothing (step 108) to produce smoothed image data $I_L(x,y)$. As already mentioned, there are various smoothing methods and any one of them can be used. In one method, image data within a certain region surrounding the position (x,y) of a pixel of interest is multiplied by Gaussian weighting coefficients and the average is taken. The parameters for determining the Gaussian weighting coefficients and the mask size of a certain region for determining the average are preliminarily set and may optionally be adjusted by the operator working on the image processing parameter inputting and setting unit 20.

In the next step 110, the smoothed image data $I_L(x,y)$ is subtracted from the sharpness enhanced image data $I_S(x,y)$ obtained in step 100, thereby extracting the edge/noise component $\Delta I_{EG}(x,y)$.

In the next step 112, the normalized edge intensity data $E_V(x,y)$ obtained in step 102 is subtracted from the value 1.0 to determine the noise region weighting coefficient $W_G(x,y)$. Since the normalized edge intensity data $E_V(x,y)$ is equivalent to the edge region weighting coefficient $W_E(x,y)$, subtracting it from 1.0 gives the noise region weighting coefficient $W_G(x,y)$ whose value is close to zero in the edge region of the object but approaches one in the other (noise) region which contains more of the noise component than the edge component.

In the next step 114, the noise region weighting coefficient $W_G(x,y)$ obtained in step 112 is multiplied by the edge/noise component $\Delta I_{EG}(x,y)$ obtained in step 110, thereby creating the signal $\Delta I_G(x,y)$ having an increased proportion of the noise information. This may be called the step of identifying the noise component.

From the thus obtained signal $\Delta I_G(x,y)$ having an increased proportion of the noise information, the noise component $G_0(x,y)$ is separated in accordance with the equation (25) representing a LUT for nonlinear transformation and the equation (26). The separated noise component $G_0(x,y)$ is multiplied by a subdividing mask $R(x,y)$ composed of random numbers or a fine pattern such as a grid pattern, thereby creating the noise suppressing component $\Delta I_G'(x,y)$ in accordance with the equation (29). This is step 116.

If the noise component is graininess, it is refined in the foregoing step by introducing fine modulations in the variations of the graininess. As for large grainy mottles that span multiple pixels, large enough density variations are eliminated while leaving only small variations so that the grainy pattern is reduced to become less pronounced. For further details of step 116, see below.

If the extracted noise component $G_0(x,y)$, or graininess, is subtracted from the original image data either as it is or after being multiplied by a coefficient, the result is close to a smoothed image and is not visually preferred since the graininess has become blurred. To solve this problem, the fluctuating density component of large grainy mottles is multiplied by a subdividing mask so that fine variations are introduced in the density fluctuation, thereby creating the noise (i.e., graininess) suppressing component $\Delta I_G'(x,y)$, which is then subtracted from the grainy original image data. As a result, the initial large fluctuation in graininess is eliminated and only fine density fluctuations are left intact, eventually reducing the large grainy mottles to fine graininess.

As will be apparent from its operating theory, the subdividing process is not effective if the noise component is spatially fine on a pixel basis as in the case of an image recorded with a digital still camera; on the other hand, it is highly effective if graininess involves large grainy mottles spanning multiple pixels.

In the next step 118, the blur retaining but sharpness enhancing component $\Delta I_{BS}(x,y)$ obtained in step 106 is multiplied by a scaling coefficient a and added to the original image data $I_1(x,y)$. At the same time, the noise suppressing component $\Delta I_G'(x,y)$ obtained in step 116 is multiplied by another scaling coefficient $\beta$ and subtracted from the original image data $I_1(x,y)$. As a result, there is provided the blur retained, sharpness enhanced and noise suppressed image data $I_2(x,y)$ as processed data outputted from the main image processing unit 16. The scaling factors $\alpha$ and $\beta$ are preliminarily set and may optionally be adjusted by the operator working on the image processing parameter inputting and setting unit 20. For example, if the operator wants to increase the degree of the blur retaining but sharpness enhancing process, the scaling coefficient a is made greater than the scaling coefficient $\beta$; on the other hand, if the operator wants to increase the degree of the noise suppressing process, $\beta$ is made greater than $\alpha$.

As a result, the edge region of the object is enhanced in sharpness but in the other region where the noise component tends to be pronounced, no edge enhancement is effected and the noise component can be eliminated without losing the intentional blur.

The various parameters for the image processing schemes to be performed in the main image processing unit 16 are optimally adjusted by the operator looking at the display of the processed image on the image monitor 22.

While an embodiment of the image processing method of the invention has been described above, it should be noted that the methods of calculating the noise region weighting coefficient (step 112), identifying the noise component (step 114) and computing the noise suppressing component (step 116) are by no means limited to those described on the foregoing pages and various other techniques for noise suppression may be employed.

The final processed image data $I_2(x,y)$ is sent to the image output device 18 which accordingly outputs a color image reproducing the color input image such as a color photographic image.

The image processing method of the invention has been described above with particular reference to the embodiment shown in FIG. 3. It should, however, be noted that step 118 for the blur retaining, sharpness enhancing and noise suppressing process is not the essential part of the invention. If there is no need to suppress the noise component, the image processing for noise suppression such as the sequence of steps 108–116 in FIG. 3 may be eliminated to substitute the image processing scheme shown in FIG. 4 which performs only the blur retaining but sharpness enhancing process. Alternatively, step 118 in the process shown in FIG. 3 may be performed with the scaling coefficient $\beta$ being adjusted to zero.

The process shown in FIG. 4 includes the steps of edge detection, sharpness enhancement and calculating the blur retaining but sharpness enhancing coefficient; these steps are identical to the counterparts in the process shown in FIG. 3 and corresponding steps are identified by like numerals. In the blur retaining step 120, the original image data $I_1(x,y)$ is subtracted from the sharpness enhanced image data $I_S(x,y)$ obtained in step 100, the difference is multiplied by the blur retaining but sharpness enhancing coefficient $C_{BS}(x,y)$ obtained in step 104, and the product is added to the original image data $I_1(x,y)$ to yield the processed image data $I_2(x,y)$.

As a result of this procedure, the necessary blurred sense of the image is retained and yet the edge region of the object is enhanced in sharpness.

While the image processing method and apparatus of the present invention have been described above in detail, the invention is by no means limited to the foregoing embodiments and it should be understood that various improvements and modifications can be made without departing from the scope and spirit of the invention.

As described above in detail, the present invention can produce the blur retaining but sharpness enhancing component by calculating the blur retaining but sharpness enhancing coefficient. If this feature is used in enhancing the sharpness of photographic images recorded by a silver halide photographic system or a digital still camera, the recorded principal object is enhanced in sharpness while, at the same time, the blur caused by the taking camera lens system in the background or the object or objects not including the principal object as the background is recognized and kept as it is, so that a natural image retaining the photograph-like necessary blurred sense can be produced. As a further advantage, the present invention suppresses, rather than enhances, graininess and other noise component in the image, thereby producing a natural photographic image of high quality that retains the necessary blurred sense and involves a reduced amount of graininess and other noise component.

What is claimed is:

1. An image processing method comprising the steps of:

applying sharpness enhancement to original image data to generate sharpness enhanced image data for a wholly sharpened image;

performing edge detection on said original image data to determine edge intensity data for distinguishing an edge region of an object and the other region in an image;

determining a blur retaining but sharpness enhancing coefficient for enhancing sharpness of the edge region of the object but retaining blur of the image in the other region of the edge region of the object based on the edge intensity data;

subtracting said original image data from said sharpness enhanced image data to generate a sharpness enhancing component;

multiplying the sharpness enhancing component by said blur retaining but sharpness enhancing coefficient to give a blur retaining but sharpness enhancing component; and adding the blur retaining but sharpness enhancing component to said original image data to generate processed image data for an image enhanced in the sharpness while retaining the blur.

2. The method according to claim 1, wherein said other region of the edge region of the object includes a blurred image region in which the blur of the image is to be retained.

3. The method according to claim 2, wherein said blur retaining but sharpness enhancing coefficient has a value equal or nearly equal to 1.0 in said edge region of the object, slowly decreases with the increasing distance from said edge region of the object and has a preset value of from 0.0 to less than 1.0 in the blurred image region.

4. The method according to claim 2, wherein said blur retaining but sharpness enhancing coefficient is expressed by the following equation (1):

$$C_{BS}(x,y)=b_0+(1-b_0)E_V(x,y) \quad (1)$$

where $C_{BS}(x,y)$ is the blur retaining but sharpness enhancing coefficient, $E_V(x,y)$ is said edge intensity data which is normalized ($0 \leq E_V \leq 1$), and $b_0$ is a blur region sharpness enhancing coefficient for adjusting degree of sharpness enhancement to be applied to the blurred image region which is other than the edge region of the object.

5. The method according to claim 1, further comprising the steps of:

smoothing said original image data to generate smoothed image data;

subtracting said smoothed image data from said sharpness enhanced image data to generate an edge/noise component including both a sharpness enhanced edge component of an object image and a sharpness enhanced noise component;

determining a noise region weighting coefficient from said edge intensity data, identifying a noise component based on said noise region weighting coefficient and said noise/edge component and producing a noise suppressing component that introduces small variations in the noise component; and scaling said blur retaining but sharpness enhancing component to generate a first scaled component, adding the first scaled component to said original image data, scaling said noise suppressing component to generate a second scaled component and subtracting the second scaled component from said original image data, thereby creating the processed image data for the image that retains the blur but which is enhanced in sharpness and has the noise component suppressed.

6. An image processing apparatus comprising:

a sharpness enhancing unit for applying sharpness enhancement to original image data to generate sharpness enhanced image data for a wholly sharpened image;

an edge detecting and computing unit for performing edge detection on said original image data and determining edge enhancement data for distinguishing between an edge region of an object and the other region in an image;

a blur retaining coefficient computing unit by which a blur retaining but sharpness enhancing coefficient for retaining blur of the image in the other region of the edge region of the object is determined from said edge intensity data;

a blur retaining but sharpness enhancing component computing unit for producing a blur retaining but sharpness enhancing component from said original image data, the sharpness enhanced image data generated in said sharpness enhancing unit, and the blur retaining but sharpness enhancing coefficient determined in said blur retaining coefficient computing unit; and a blur retaining and sharpness enhancing unit for adding said blur retaining but sharpness enhancing component produced by said blur retaining but sharpness enhancing component computing unit to said original image data, thereby creating processed image data for an image that retains the blur but which is enhanced in the sharpness.

7. The apparatus according to claim 6, wherein said other region of the edge region of the object includes a blurred image region in which the blur of the image is to be retained.

8. The apparatus according to claim 7, wherein said blur retaining but sharpness enhancing coefficient has a value equal or nearly equal to 1.0 in said edge region of the object, slowly decreases with the increasing distance from said edge region of the object and has a preset value of from 0.0 to less than 1.0 in the blurred image region.

9. The apparatus according to claim 7, wherein said blur retaining but sharpness enhancing coefficient is expressed by the following equation (1):

$$C_{BS}(x,y)=b_0+(1-b_0)E_V(x,y) \quad (1)$$

where $C_{BS}(x,y)$ is the blur retaining but sharpness enhancing coefficient, $E_V(x,y)$ is said edge intensity data which is normalized ($0 \leq E_V \leq 1$), and $b_0$ is a blur region sharpness enhancing coefficient for adjusting degree of sharpness enhancement to be applied to the blurred image region which is other than the edge region of the object.

10. The apparatus according to claim 6, further comprising:

a smoothing unit for smoothing said original image data to generate smoothed image data;

a noise region weighting coefficient computing unit for determining a noise region weighting coefficient from said edge intensity data;

an edge/noise component extracting unit for subtracting said smoothed image data from said sharpness enhanced image data to generate an edge/noise component including both a sharpness enhanced edge component of an object image and a sharpness enhanced noise component;

a noise suppressing component computing section for identifying a noise component based on said edge/noise component and said noise region weighting coefficient and producing a noise suppressing component that introduces small variations in the noise component; and a blur retaining, sharpness enhancing and noise suppressing section for scaling said blur retaining but sharpness enhancing component to generate a first scaled component, adding the first scaled component to said original image data, scaling said noise suppressing component to generate a second scaled component and subtracting the second scaled component from said original image data, thereby creating the processed image data for the image that retains the blur but which is enhanced in the sharpness and has the noise component suppressed.

* * * * *